Figures 1, 2:
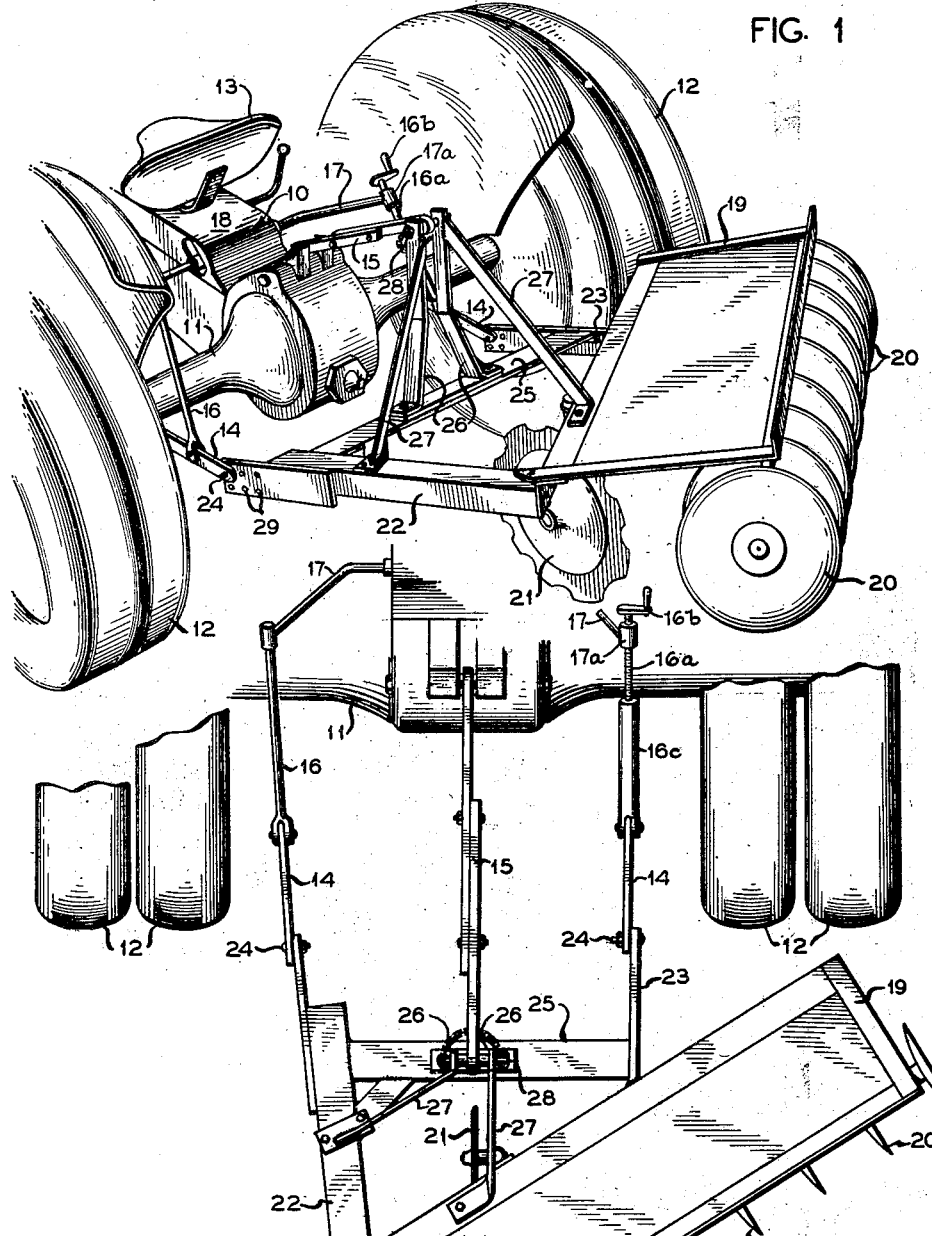

Oct. 20, 1953  E. H. HOLDEN  2,655,855
MULTIPLE PURPOSE CULTIVATOR ATTACHMENT
Filed July 14, 1949

INVENTOR.
E. H. HOLDEN
BY
A. Yates Dowell
ATTORNEY

Patented Oct. 20, 1953

2,655,855

UNITED STATES PATENT OFFICE 2,655,855

MULTIPLE PURPOSE CULTIVATOR ATTACHMENT

Elmer H. Holden, Bethpage, N. Y.

Application July 14, 1949, Serial No. 104,741

1 Claim. (Cl. 97—47.44)

This invention relates to soil cultivation and more particularly to agricultural implements employed in the preparation and cultivation of the soil. Specifically, the invention relates to disc harrows and other implements for breaking and turning the soil.

Heretofore, a large number and variety of implements have been required in addition to the tractor or power vehicle in order to perform certain operations and to accomplish the desired results. Due to the number of implements required this equipment has been both difficult and expensive to obtain, particularly by the farmer of limited resources.

In addition to their cost, the cultivating implements employed have not been satisfactory for various other reasons. Among these reasons are that they have been cumbersome and difficult to operate and adjust for producing differences in cutting depth and other varied results, they were of complicated construction and did not readily lend themselves to full cultivation including close proximity to trees, fences, and other objects and obstacles, and they are inclined to cut too deeply.

An object of the invention is to overcome these objectionable features and to provide an agricultural implement of simple and inexpensive construction which can be easily operated and adjusted to produce numerous results ordinarily requiring the use of several implements so that the reduction in costs, the amount of labor employed, housing facilities therefor, and the like are material thereby resulting in a device of substantially greater flexibility.

Another object of the invention is to provide a disk harrow in which the cutting depth can be easily controlled and the angularity of draft maintained in a manner to facilitate cultivation at close proximity to objects as well as one in which the operation may be varied between a flat and a terracing operation.

A further object of the invention is to provide a disk type plow or harrow in which the pulling force is exerted at substantially the trailing end of the plow in order to make it possible to more satisfactorily accomplish certain tilling operations.

Further objects and advantages of the invention will be apparent from the following description taken in conjunction with the accompanying drawings, wherein:

Fig. 1 is a fragmentary perspective of the rear end of a tractor and attachment in accordance with the present invention connected thereto; and, Fig. 2, a fragmentary top plan view better illustrating the manner of attachment.

With continued reference to the drawing, a conventional tractor 10 has a rear axle housing 11, driving wheels 12, and an operator's seat 13. The tractor may be provided with a conventional three point suspension system including draft bar means 14 pivotally mounted at each side of the center portion of the axle housing 11, and central draft bar means 15. Said draft bar means 14 are adjustably supported by rods 16 and 16a pivotally attached thereto and connected at their opposite ends to bars 17. The bars 17 are rotatably mounted within a housing 18 on the tractor and a connection to the source of power is provided for oscillating the bars 17 and thus raising or lowering the draft bars 14.

Rod 16a is rotatably mounted adjacent its upper end in a bearing 17a attached to bar 17, and is provided with a handle 16b for rotation of its lower threaded end in a threaded socket 16c. This conventional structure permits variation of the length of rod 16a and varies the relative positions of the lower ends of rods 16 and 16a.

The plow or harrow of the present invention comprises a generally rectangular frame 19 having rotatably mounted therebeneath a series of disks 20. Forwardly of the disks 20 and also rotatably mounted on the frame 19 is a single coulter disk or land side wheel 21 intended to guide the plow in a straight line during operation thereof.

Rigidly attached to the frame 19 adjacent the left end thereof as viewed in Fig. 2 is a towing or pulling hitch or arrangement comprising bars 22 and 23 for pivotal attachment to the draft bars 14 by screw threaded fasteners or the like 24. A cross member member 25 extends between and connects bars 22 and 23 to reinforce or strengthen the same.

Centrally of the member 25 there is provided an upstanding structure comprising bars 26 additionally supported by angular braces 27 extending downwardly to the frame 19 and bar 22. Adjacent the upper ends of bars 26 there is provided a pivot pin 28 for securing the bar 15.

The pivotal connections at 24 and 28 are somewhat loose and flexible permitting the frame 19 to twist slightly during use as an inclined cultivator.

As will be seen from an inspection of Fig. 2, the extreme right hand disk 20 extends slightly beyond the path of travel of the outer driving wheel 12 in order to permit operation close to and in fact if necessary in contact with obstructions such as rocks, trees, fence posts and the like.

The angular relationship between the disk 20 and the line of draft or path of movement of the tractor 10 determines the type of furrow cut in the soil and likewise determines to a large extent the amount of draft power required to move the harrow. For this reason a plurality of apertures 29 are provided in the bars 22 and 23 for the reception of screw threaded or other fastening means 24 which may be utilized to adapt the plow or harrow for any appropriate type of work. It will be noted that the entire pull on the device is adjacent the left hand or following end thereof, and consequently the leading end will not tend to cut too deeply into the ground as would be the case if the pull or draft were at the right hand or leading end.

In adjusting the device for operation either as a flat breaker or an inclined cultivator, the left hand or trailing end thereof is set for the depth desired at that point and all other adjustment accomplished by rotating handle 166 to raise or lower the right or leading end. This adjustment with the structure of the present invention will not appreciably affect the action of the land side wheel 21 and the left hand disk 20 will not dig in or take too shallow a cut regardless of the adjustment made to the right hand end of the device. This construction and arrangement permit easy and quick adjustment from a flat breaker to an inclined cultivator by the tractor operator from his seat 13 and result in a device which will efficiently perform the operations desired without the disadvantages found in many prior devices. Furthermore, the means for attaching the device may be easily constructed of readily available material and in fact could undoubtedly be made in many farm blacksmith or repair shops.

It will be readily apparent that by the present invention simple, inexpensive, and useful cultivation means is provided by which the work of a number of prior devices can be easily and satisfactorily performed. Thus the necessity of a large number of expensive implements or pieces of machinery is avoided and it is possible at considerably reduced cost to perform the necessary operations quickly and expeditiously without the loss of time in changing implements or the provision of housing facilities therefor, as well as deterioration of such equipment.

Cultivation can be done on relatively flat, inclined, or other areas by simple manipulation of the device and due to the particular construction and its connection to the rear of the tractor it can be elevated from contact with the soil during transfer from one area to another.

It will be obvious to those skilled in the art that various changes may be made in the invention without departing from the spirit and scope thereof and therefore the invention is not limited by that which is shown in the drawings and described in the specification but only as indicated in the appended claim.

What is claimed is:

A plow attachment for a tractor having a three-point suspension system with an adjustable linkage comprising a frame secured at a forwardly diverging acute angle relative to the direction of movement of said tractor, a plurality of disks rotatably mounted in side-by-side relation below and attached to said frame, said disks forming a row of substantial width, a relatively short forwardly extending hitch bar secured to said frame between the ends thereof and attachable to one point of the suspension system rearwardly of the tractor and adjacent one wheel thereof with at least the foremost disk of said row of disks outwardly of the tread of the said adjacent wheel of the tractor, a second transversely spaced forwardly extending hitch bar secured to said frame and being of appreciably greater length than said first bar and attachable to a second point of the suspension system adjacent another wheel of the tractor, and vertically spaced means for attachment of the frame to another point of the suspension system, and a coulter wheel mounted on the frame substantially vertically spaced below the said last mentioned attachment point for engagement with the ground for limiting lateral movement of said disk plow.

ELMER H. HOLDEN.

References Cited in the file of this patent

UNITED STATES PATENTS

| Number | Name | Date |
|---|---|---|
| 2,320,141 | Knott | May 25, 1943 |
| 2,467,111 | Coon | Apr. 12, 1949 |

FOREIGN PATENTS

| Number | Country | Date |
|---|---|---|
| 549,114 | Great Britain | Nov. 6, 1942 |